United States Patent
Gupta et al.

(10) Patent No.: US 11,075,991 B2
(45) Date of Patent: Jul. 27, 2021

(54) PARTITIONING DATA ACCORDING TO RELATIVE DIFFERENCES INDICATED BY A COVER TREE

(71) Applicant: Amazon Technologies, Inc., Seattle, WA (US)

(72) Inventors: Pracheer Gupta, Stanford, CA (US); Poorna Chand Srinivas Perumalla, Seattle, WA (US); Jia Bi Zhang, Seattle, WA (US); Srikanth Kandalam Srinivasa, Seattle, WA (US); Madan Mohan Rao Jampani, Mountain View, CA (US); Stefano Stefani, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/839,821

(22) Filed: Apr. 3, 2020

(65) Prior Publication Data
US 2020/0236171 A1    Jul. 23, 2020

Related U.S. Application Data

(63) Continuation of application No. 15/714,826, filed on Sep. 25, 2017, now Pat. No. 10,616,338.

(51) Int. Cl.
*H04L 29/08* (2006.01)
*G06F 16/27* (2019.01)
*G06F 16/22* (2019.01)

(52) U.S. Cl.
CPC ...... *H04L 67/1097* (2013.01); *G06F 16/2237* (2019.01); *G06F 16/27* (2019.01)

(58) Field of Classification Search
CPC ... H04L 67/1097; G06F 16/27; G06F 16/2237
See application file for complete search history.

(56) References Cited

U.S. PATENT DOCUMENTS

| | | | |
|---|---|---|---|
| 6,122,628 A | 9/2000 | Castelli et al. |
| 6,674,911 B1 | 1/2004 | Pearlman et al. |
| 6,834,278 B2 | 12/2004 | Yu et al. |
| 7,007,019 B2 | 2/2006 | Kanno |
| 7,080,065 B1 | 7/2006 | Kothuri et al. |
| 7,216,129 B2 | 5/2007 | Aono et al. |
| 7,961,186 B2 | 6/2011 | Li |

(Continued)

OTHER PUBLICATIONS

McInnes, Leland, and John Healy. "Accelerated hierarchical density based clustering." 2017 IEEE International Conference on Data Mining Workshops (ICDMW). IEEE, 2017.*

(Continued)

*Primary Examiner* — Jimmy H Tran
(74) *Attorney, Agent, or Firm* — Robert C. Kowert; Kowert, Hood, Munyon, Rankin & Goetzel, P.C.

(57) ABSTRACT

A data set may be partitioned according to relative differences indicated by a cover tree. A cover tree may be generated for a data set. Items in the data set may be stored at the same or different nodes according to the relative difference between the items indicated in the cover tree. Portions of the cover tree may be assigned to different nodes storing the data set. Access requests for the data set may be performed by sending the access requests to nodes identified according to the assigned portions of the cover tree.

20 Claims, 9 Drawing Sheets

(56) References Cited

U.S. PATENT DOCUMENTS

| | | | |
|---|---|---|---|
| 8,244,498 B2 | 8/2012 | Wold et al. | |
| 8,363,936 B2 | 1/2013 | Divorra Escoda et al. | |
| 8,645,380 B2 | 2/2014 | Wang et al. | |
| 8,843,525 B2* | 9/2014 | Roh | G06F 16/283 |
| | | | 707/797 |
| 8,863,096 B1* | 10/2014 | Bucur | G06F 11/3604 |
| | | | 717/135 |
| 8,930,407 B2 | 1/2015 | Shmueli et al. | |
| 8,983,959 B2 | 3/2015 | Isaacson et al. | |
| 9,022,936 B2 | 5/2015 | Rothberg et al. | |
| 9,062,985 B2 | 6/2015 | Demiryurek et al. | |
| 9,286,043 B2 | 3/2016 | Jubran et al. | |
| 9,313,164 B2 | 4/2016 | Suryavanshi | |
| 9,774,401 B1* | 9/2017 | Borrill | H04L 9/0852 |
| 10,616,338 B1 | 4/2020 | Gupta et al. | |
| 2002/0178158 A1 | 11/2002 | Kanno | |
| 2005/0267911 A1 | 12/2005 | Kamath et al. | |
| 2007/0239759 A1* | 10/2007 | Shen | G06F 16/134 |
| 2007/0250476 A1 | 10/2007 | Krasnik | |
| 2009/0164171 A1 | 6/2009 | Wold et al. | |
| 2009/0196517 A1 | 8/2009 | Divorra Escoda et al. | |
| 2010/0070509 A1* | 3/2010 | Li | G06F 16/41 |
| | | | 707/747 |
| 2011/0016124 A1 | 1/2011 | Isaacson et al. | |
| 2011/0055140 A1 | 3/2011 | Roychowdhury | |
| 2011/0099205 A1 | 4/2011 | Shmueli et al. | |
| 2012/0117122 A1 | 5/2012 | Wang et al. | |
| 2012/0317142 A1 | 12/2012 | Broecheler et al. | |
| 2014/0046593 A1 | 2/2014 | Demiryurek et al. | |
| 2015/0154239 A1* | 6/2015 | Boldyrev | G06F 16/2264 |
| | | | 707/741 |
| 2017/0347128 A1 | 11/2017 | Panusopone et al. | |
| 2018/0191759 A1* | 7/2018 | Baijal | H04L 63/1425 |
| 2018/0205790 A1* | 7/2018 | Mercian | H04L 41/0893 |
| 2018/0357262 A1* | 12/2018 | He | G06F 16/285 |

OTHER PUBLICATIONS

Mike Izbicki, et al., "Faster Cover Trees", Proceeding of the 32 International Conference on Machine Learning, JMLR: W&CP, vol. 37, 2015, pp. 1-9.

U.S. Appl. No. 15/815,664, filed Nov. 16, 2017, Marc John Brooker.

Tziortziotis, Nikolaos, et al., "Cover tree bayesian reinforcement learning." The Journal of Machine Learning Research 15, 2014, pp. 2313-2335.

Stowell, Dan, and Mark D. Plumbley. "Fast multidimensional entropy estimation by $k$-d partitioning." IEEE Signal Processing Letters, vol. 16, No. 6, Jun. 2009, pp. 537-540.

Ferreira, Carlos E., et al. "Formulations and valid inequalities for the node capacitated graph partitioning problem." Mathematical Programming 74, 1996, pp. 247-266.

Heiskanen, Janne, et al., "Assessment of multispectral,-temporal and-angular MODIS data for tree cover mapping in the tundra-taiga transition zone." Science Direct, Remote Sensing of Environment 112, 2008, pp. 2367-2380.

Clarkson, Kenneth L. "Nearest-neighbor searching and metric space dimensions." Nearest-neighbor methods for learning and vision: theory and practice, 2006, pp. 15-59.

Banaei-Kashani, Farnoush, et al., "SWAM: a family of access methods for similarity-search in peer-to-peer data networks." Proceedings of the thirteenth ACM international conference on Information and knowledge management. ACM, 2004, pp. 1-10.

Zhong, Caiming, et al. "A fast minimum spanning tree algorithm based on K-means." Information Sciences 295, 2015, pp. 1-17.

Beygelzimer, Alina, et al. "Cover trees for nearest neighbor." Proceedings of the 23rd international conference on Machine learning. ACM, 2006, pp. 97-104.

Muja, Marius, et al., "Scalable nearest neighbor algorithms for high dimensional data." IEEE transactions on pattern analysis and machine intelligence, vol. 36, No. 11, Nov. 2014, pp. 2227-2240.

* cited by examiner

PARTITIONING DATA ACCORDING TO RELATIVE DIFFERENCES INDICATED BY A COVER TREE

This application is a continuation of U.S. patent application Ser. No. 15/714,826, filed Sep. 25, 2017, which is hereby incorporated by reference herein in its entirety.

BACKGROUND

Data is often distributed to scale the storage capacity or processing capacity of systems that provide access to the data. For example, data sets can be divided into partitions in order to leverage the capacity of different hosts, such as different servers or other computing devices, to separately provide access to individual partitions. The assignment or allocation of data into different partitions can also impact the performance of queries and other access operations to the data set. If, for instance, like data were stored close together (e.g., on a same partition), then queries retrieving similar data would have fewer locations to search in order to provide a result. Thus, techniques that can optimize the assignment of data of a data set to different locations may be desirable.

Figure 1:
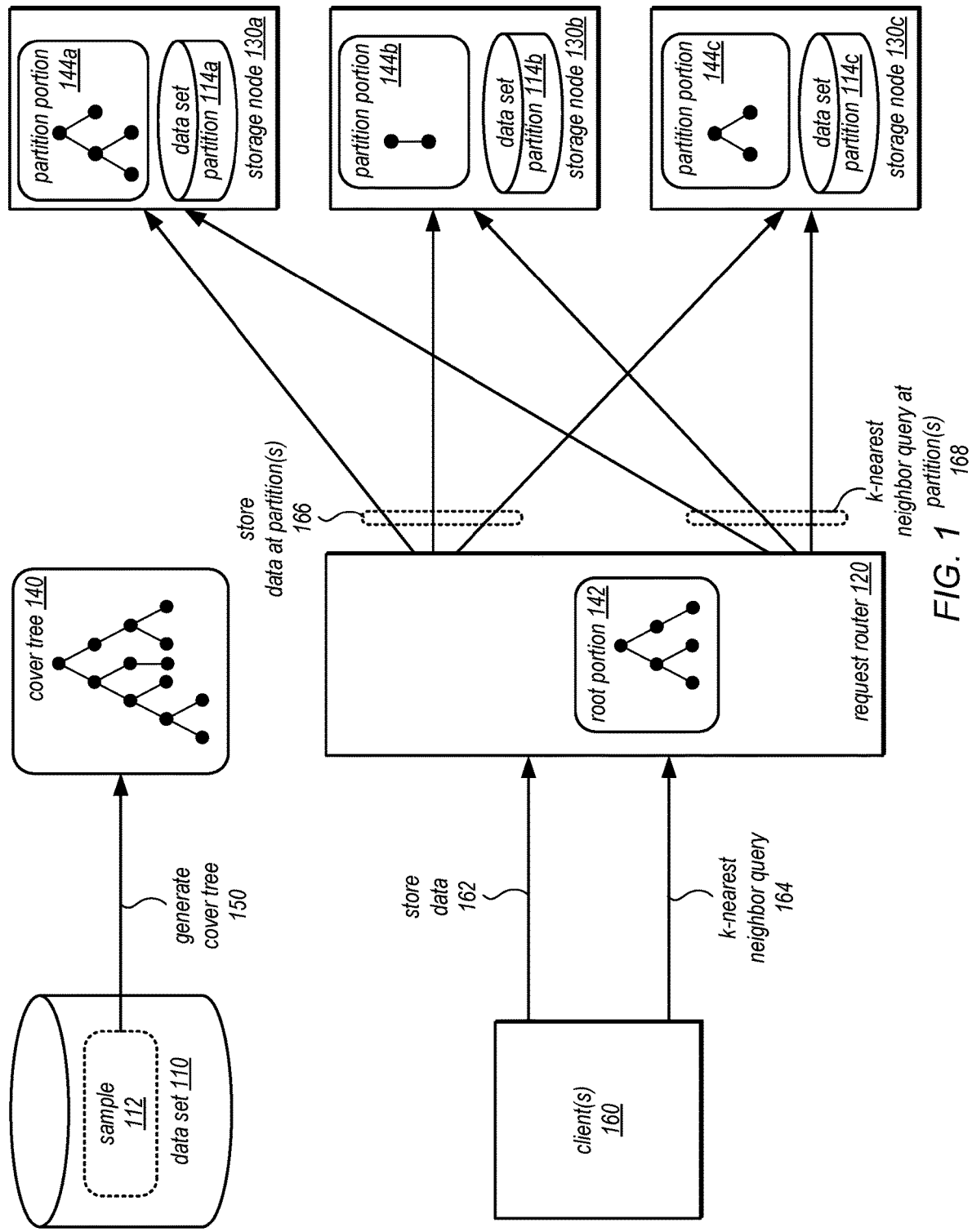
FIG. 1 is a logical block diagram illustrating partitioning data according to relative differences indicated by a cover tree, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement partitioning data according to relative differences indicated by a cover tree, according to some embodiments. Data may be distributed across one or more locations in a storage system in different partitions, in some embodiments. In this way, clients can access and independently update different partitions of the data set at the one or more locations in the storage system, in some embodiments. For example, partitions may be identified and created according to schemes that distribute the data amongst partitions evenly, or nearly evenly, according to cover tree, in some embodiments. The partitions can then be evenly assigned or allocated to different locations within the distributed system so that the processing responsibility may be evenly (or nearly or substantially evenly) distributed, in one embodiment.

Different types of data and the different ways in which the data is accessed may benefit from how the distribution of a data set among partitions is performed, in some embodiments. In some embodiments, data searched or evaluated using k-nearest neighbor queries may, for instance, may benefit from similar data (where the relative different between individual items of data is small) being co-located in a same partition. In this way, when the number of neighbors that is determined to be the closest or nearest to a given data item in the query (e.g., where k=7 and the results are the 7 items that have the smallest relative difference with the given item) are found, it is likely that some or all may be within a single partition.

Partitioning data according to relative differences indicated by a cover tree may provide a distribution of a data set among partitions that co-locates partitions similar in metric space, in some embodiments. For example, data items may be vectors (or other data that plots, maps, points, indicates, or is derivable to obtain) that occupy locations within metric space. The relative distance between the vectors in the metric space may indicate the relative difference between the vectors, in some embodiments. Cover trees may, in some embodiments, divide up the metric space according to the membership of data items as nodes in different sub-portions of the cover tree. In this way, co-location in a sub-portion of a tree may indicate co-location within a portion of metric space.

FIG. 1 is a logical block diagram illustrating partitioning data according to relative differences indicated by a cover tree, according to some embodiments. Data set 110 may be used to generate 150 cover tree 140. In some embodiments, a sample 112 of items (e.g., 10% of items in data set 110) may be selected (e.g., randomly) to generate the cover tree, according to various techniques such as those discussed below with regard to FIG. 6A. Once cover tree 140 is generated, different sub-portions of the tree may be selected, such as partition portions 144a, 144b, and 144c, and assigned to map different partitions of data set 110, such as data set partition 114a, 114b, and 114c to different storage nodes, such as storage nodes 130a, 130b, and 130c. For example, as discussed below with regard to FIG. 6A, estimated numbers of data set 110 items can be determined for each partition according to the ways in which cover tree 140 is divided (e.g., a number of leaf nodes in each sub-portion). Once cover tree 140 is divided into partition portions, items of data set 110 may be distributed and stored in the respective partitions 114 determined according to the partition portion which includes the item (e.g., according to the ingestion techniques discussed below with regard to FIG. 3).

The root portion 142 of cover tree 140 may be provided, stored, or otherwise made accessible to a request router 120 which may provide access to data set 110 at storage nodes 130 on behalf of client(s) 160. Root portion 142 may be the remaining portion of cover tree 140 which can identify the parent node (or root node) of the sub-portion. In this way, request router 120 can traverse root portion 142 to identify which partition of data set 110 may be accessed in response to a request. For example, client(s) 160 may send a request to store data 162 (e.g., another item, such as another vector) into data set 110. Request router 120 may access root portion 142 to identify which partition would include the item in its partition portion 144. The request may be forwarded 166 to the appropriately identified storage node 130 which may perform the operation and store the data in the respective partition 114.

Similarly, a k-nearest neighbor query 164 may be received from client(s) 160 at request router 120. The query 164 may include a given item to use as the predicate or selection criteria for determining which data items in data set 110 are nearest up to the specified k value. Request router 120 may access root portion 142 to identify which partition would include the item in its partition portion 144. The request may be forwarded 166 to the appropriately identified storage node 130 which may perform the query and return results based on the data in the respective partition 114 of that storage node 130.

Please note that previous descriptions of implementing partitioning data according to relative differences indicated by a cover tree are not intended to be limiting, but are merely provided as logical examples. The number of storage nodes, organization and partition of the cover tree, data set, clients or request router 120 may be different, for example.

This specification begins with a general description of a provider network that may implement a storage service. The storage service may implement partitioning data according to relative differences indicated by a cover tree, in one embodiment. Then various examples of the storage service are discussed, including different components/modules, or arrangements of components/module, that may be employed as part of implementing the storage service, in one embodiment. A number of different methods and techniques to implement partitioning data according to relative differences indicated by a cover tree are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
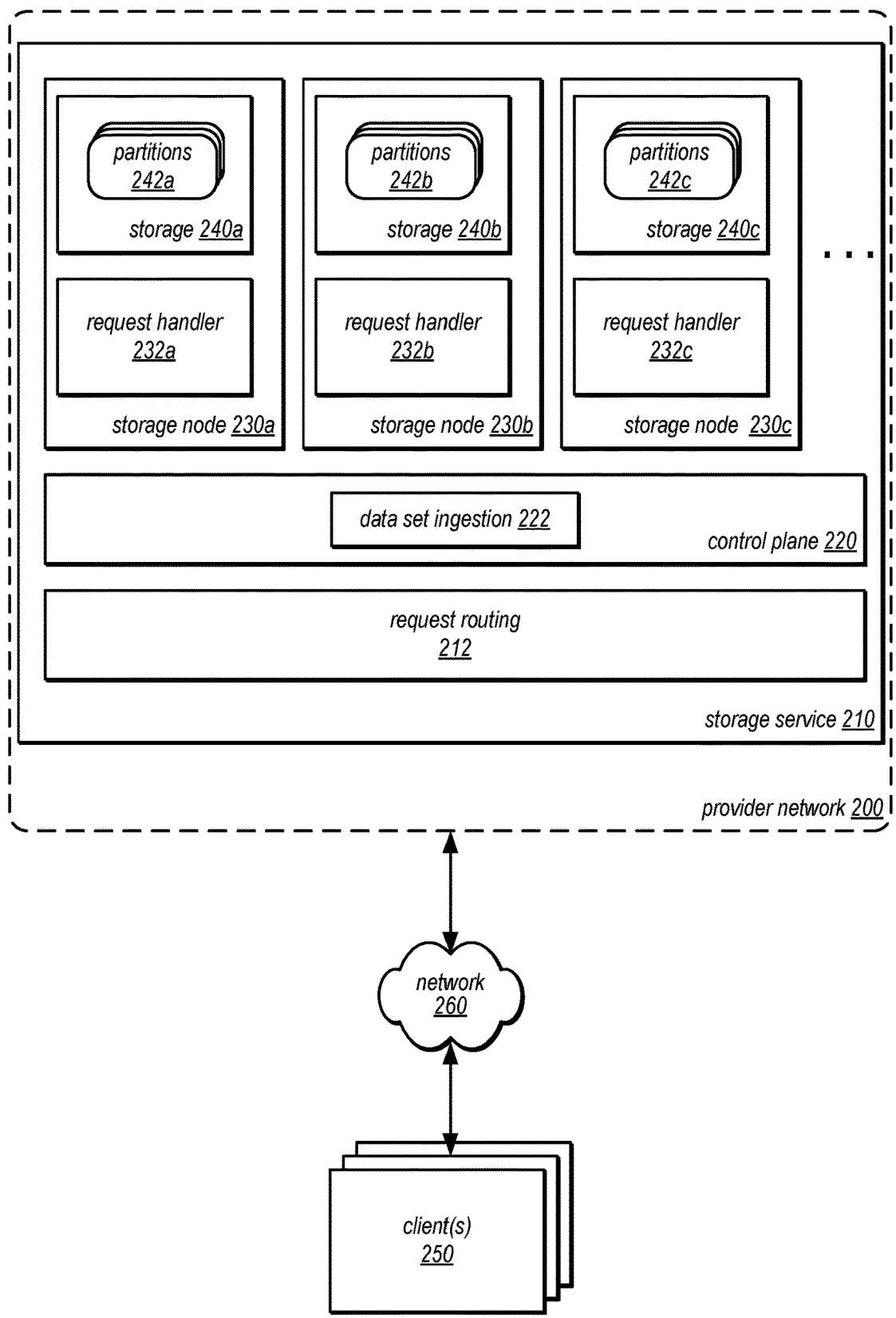
FIG. 2 is a logical block diagram illustrating a provider network that implements a storage service that partitions vector data according to relative differences indicated by a cover tree, according to some embodiments.

FIG. 2 is a logical block diagram illustrating a provider network that implements a storage service that partitions vector data according to relative differences indicated by a cover tree, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In one embodiment, provider network 200 may implement various computing resources or services, such as storage service(s) 210 (e.g., services that ingest, maintain, query or otherwise provide access to data across one or multiple nodes), or other services, such as map reduce processing services, data warehouse services, data flow processing services, object storage services, block-based storage services, virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 8 and described below. In one embodiment, the functionality of a given system or service component (e.g., a component of storage service(s) 210) may be implemented by a particular node or may be distributed across several nodes. In some embodiments, a given node may implement the functionality of more than one service system component (e.g., more than one data store component).

Storage service(s) 210 may include various types of storage services, in one embodiment, for storing, querying, and updating data. Such services may be enterprise-class storage systems that are highly scalable and extensible. In one embodiment, queries may be directed to a data set in storage service(s) 210 that is distributed across multiple physical resources, and the resources may be scaled up or down on an as needed basis. In one embodiment, storage service(s) 210 may provide a RESTful programmatic interface in order to submit access requests (e.g., to get, insert, delete, or query data), such as interface 302 discussed below with regard to FIGS. 3 and 4. In one embodiment, storage service(s) 210 may also be any of various types of data processing services to perform different functions (e.g., query or other processing engines to perform functions such as anomaly detection, machine learning, data lookup, or any other type of data processing operation).

In one embodiment, clients 250 may encompass any type of client configurable to submit network-based requests to provider network 200 via network 260, including requests for storage service(s) 210 (e.g., to store a new vector or perform a k-nearest neighbor query). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to provider network 200 to other applications in a manner that is transparent to those applications. For example, client 250 may integrate with a data set on storage service(s) 210 (e.g., for various machine learning applications). In such an embodiment, applications may not need to be modified to make use of the storage system service model. Instead, the details of interfacing to the storage service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Storage service 210 may implement request routing 212 which may include one or multiple nodes configured to receive and dispatch requests from clients 250 via an interface over network 260. Request routing 212 may dispatch requests to the appropriate storage nodes to perform the request, according to the techniques discussed below with regard to FIGS. 4 and 7A.

Storage service 210 may control plane 220, in one embodiment. Storage service 210 may implement control plane 220 to implement one or more administrative components, which may provide a variety of visibility and/or control functions. In one embodiment, storage service 210 may also implement a plurality of nodes 230, which may implement a data store in distributed fashion as cluster or group of one or more nodes 230 storing data on behalf of users. A data set may be divided into multiple partitions, which may be distributed amongst the nodes of a cluster 230. Each node 230 may manage one or more partitions 242 of the database on behalf of clients/users.

Control plane 220 may provide visibility and control to system administrators, anomaly control, and/or resource allocation, in one embodiment. In one embodiment, control plane 220 may also include an admin console, through which system administrators may interact with storage service 210 (and/or the underlying system). In one embodiment, the admin console may be the primary point of visibility and control for storage service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed or other operations to change a size or number of nodes in a cluster, at storage service 210, in one embodiment.

Control plane 220 may direct the performance of different types of control plane operations among the nodes, systems, or devices implementing storage service 210, in one embodiment. For instance, control plane 220 may communicate with nodes to initiate the performance of various control plane operations, such as migrations, update data sets, regenerate cover trees or other indexes, etc. . . . In one embodiment, control plane 220 may update a task registry (or some other table or data structure) with the status, state, or performance information of the control plane operations currently being performed. Control plane 220 may detect, direct, or otherwise instigate different partition migration operations to add, remove, or modify the membership of nodes in a cluster.

An interface for storage service 210 may support handling requests formatted according to an interface to support different types of web services requests. For example, in one embodiment, storage service 210 may implement a particular web services application programming interface (API) that supports a variety of operations on data sets that are maintained and managed on behalf of clients/users by the storage service. In one embodiment, storage service 210 may support different types of web services requests. For example, in one embodiment, storage service 210 may implement a particular web services application programming interface (API) that supports a variety of operations on data sets that are maintained and managed on behalf of clients/users by the storage service. In one embodiment, control plane 220 may perform authentication, metering, and dispatching service requests.

Storage nodes, such as storage nodes 230a, 230b, and 230c, may implement respective request handlers, such as request handlers 232a, 232b, and 232c in some embodiments. Request handler 232 may implement database management, in one embodiment. Request handler 232 may create, update, define, query, and/or otherwise administer a partition 242 of a data set at the storage node 230, in one embodiment. For instance, request handler 232 may implement different insertion and querying engines for data according to the forma in which the data is stored. For example, data of a partition 242 may be stored for searching according to a cover tree or may be searched using a different indexing scheme for nearest neighbor searching (e.g., locally sensitive hashing), in some embodiments. Thus request handler 232 may be able to perform or interpret different queries with different types of indexing schemes implement for the data stored on that node 230. In one embodiment, request handler 232 may handle requests to access the data (e.g., to insert, modify, add, or delete data as well as requests to query for data). In one embodiment, request handler 232 may also perform other management functions, such as enforcing access controls or permissions, concurrency control, or recovery operations. In one embodiment, request handler 232 may implement a storage engine to access partitions, such as partitions 242a, 242b, and 242c, in storage 240 in order to process access requests (e.g., requests to read or write to items within different partitions or particular items or parts of data within a partition).

In one embodiment, request handler 232 may provide to access storage, such as storage 240a, 240b, and 240c, accessible to individual nodes 230. For example storage 240a may be one or more memory devices that are implemented as part of a host system for node 230a, and may only be accessible to that node. While in some embodiments, storage 240 may be memory devices (e.g., RAM memory devices) in other embodiments, block-based, persistent storage devices (e.g., solid state drives or hard disk drives) may be implemented as storage for partitions 242.

In one embodiment, storage service 210 may provide functionality for creating, accessing, and/or managing data sets processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. For example, a node that is member of one cluster for hosting user A's data set, may also store a partition of another data set for user B, as part of a different cluster, e.g., cluster, in one embodiment.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Figure 3:
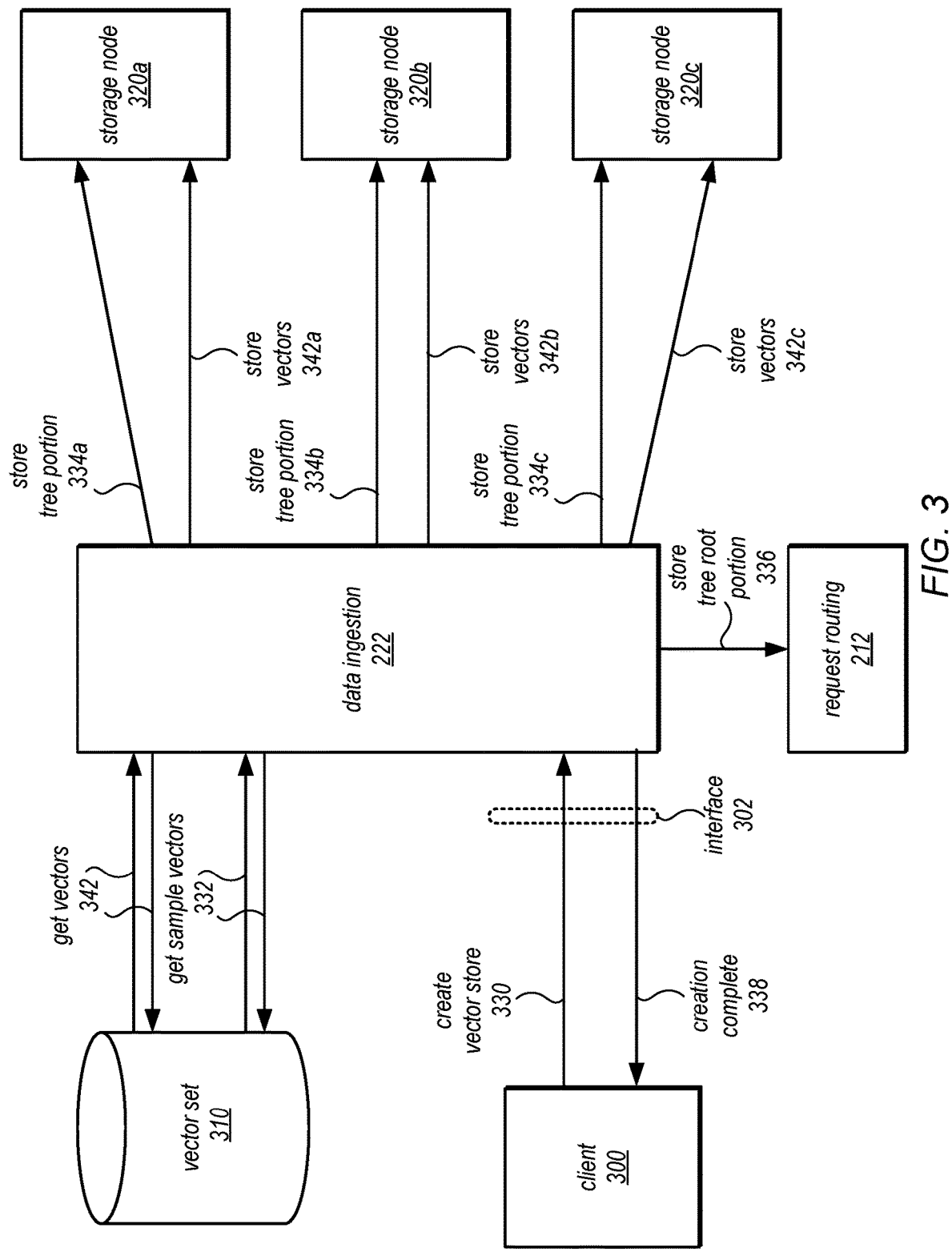
FIG. 3 is a logical block diagram illustrating data set ingestion according to relative differences indicated by a cover tree, according to some embodiments.

As noted above with regard to FIG. 2, ingestion of data sets may be performed on behalf of users in order to move a data set of vectors into storage service 210. FIG. 3 is a logical block diagram illustrating data set ingestion according to relative differences indicated by a cover tree, according to some embodiments. Client 300 may send a request to create a vector store to storage service 210 via 302 which dispatch the request to data ingestion 222. Interface 302 may be a programmatic interface (e.g., implementing different Application Programming Interface (API) calls, such as a call for creating a vector store), graphical user interface (e.g., a web-based user-interface), a command line interface, or some combination of interfaces to provide clients, like client 300 (which may be like client(s) 250).

Create vector store request 330 may identify a vector set 310 storage location, provide access keys or other credentials to obtain the vector set, and/or specify a format or arrangement of resources to store the vector set 310 (e.g., a number of nodes in a storage cluster), in some embodiments. Data ingestion 222 may parse the request 330, identify a number of storage nodes, such as storage nodes 320a, 320b, and 320c to store vector set 310 and begin an ingestion workflow, process, or other operation. For example, data ingestion 222 may implement cover tree generation techniques similar to those discussed above with regard to FIG. 1 and below with regard to FIG. 6A which may obtain samples of the data set to generate the cover tree for partitioning vector set 310

For example, data ingestion may send one or more requests to get sample vectors 332 from vector set 310 (e.g., using access credentials provided in create vector store request 330). Vector set 310 may be stored in another storage service or data store implemented in provider network 200 (e.g., in an object-based store), in some embodiments. In some embodiments, vector set 310 may be stored in an external (e.g., on premise) data store with respect to provider network 200. Once sample data vectors are obtained, data ingestion 222 may generate a cover tree based on the sampled vectors, determine estimated numbers of vectors, based on the sample, that may be associated with leaf nodes, and make partition assignments to nodes (e.g., to balance the number of possible nodes that may be stored at the respective storage nodes 320).

Figure 7A:
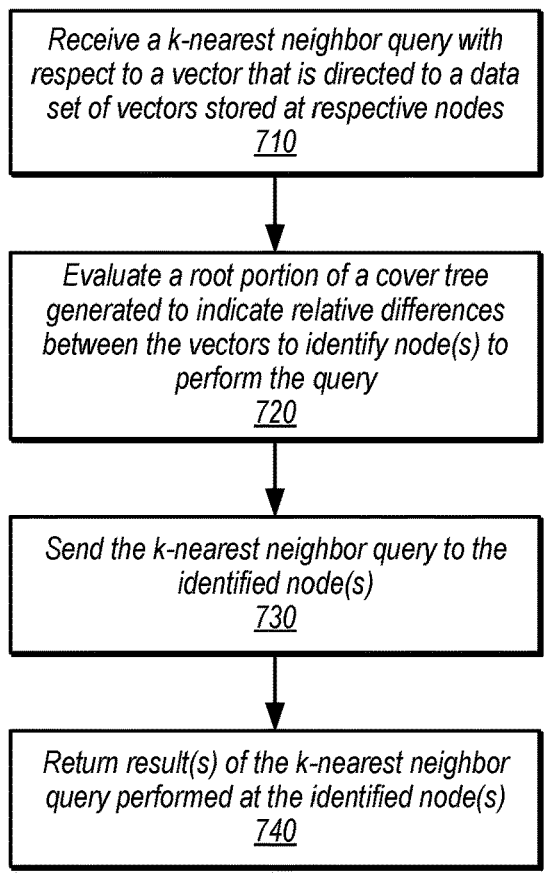
FIGS. 7A-7B are high-level flowcharts illustrating various methods and techniques to perform access requests directed to a vector data set partitioned according to relative differences indicated by a cover tree, according to some embodiments.
Figure 7B:
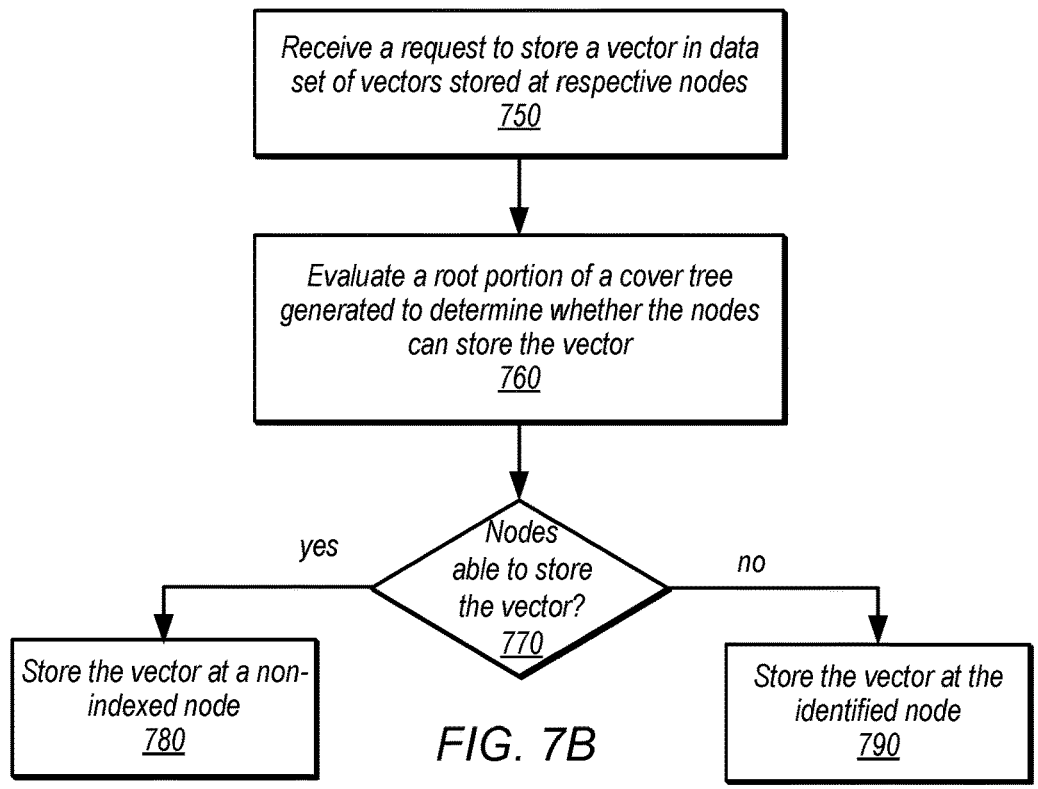

As illustrated in FIG. 3, data ingestion may store the index root portion 336 as part of request routing 212 in order to determine which storage nodes store a partition, as discussed below with regard to FIGS. 4 and 7A-7B. Data ingestion 222 may store the assigned portions of the cover tree at each of the assigned storage nodes for processing access requests, as discussed below with regard to FIGS. 4 and 7A-7B. For example, a request to store tree portions to each storage node, such as requests 334a, 334b, and 334c, may be performed, in some embodiments.

Data ingestion 222 may also ingest the entire vector set 310 for storage at storage nodes 320. For example, data ingestion 222 may send requests 342 to get the vectors, and then store them at one of the storage nodes according to the mapping (e.g., by accessing a copy of the tree root portion of the cover tree to determine which storage node is to store the vector). For example, for vectors identified as mapped to storage node 320a, data ingestion 222 may send requests to store vectors 342a. Similarly requests to store vectors to storage nodes 320b and 320c respectively may store vectors 342b and 342c, in some embodiments. Data ingestion 222 may provide a completion indication 338 to client 300, in some embodiments. Status information or errors may also be provided to client 300 via interface 302 (not illustrated).

Figure 4:
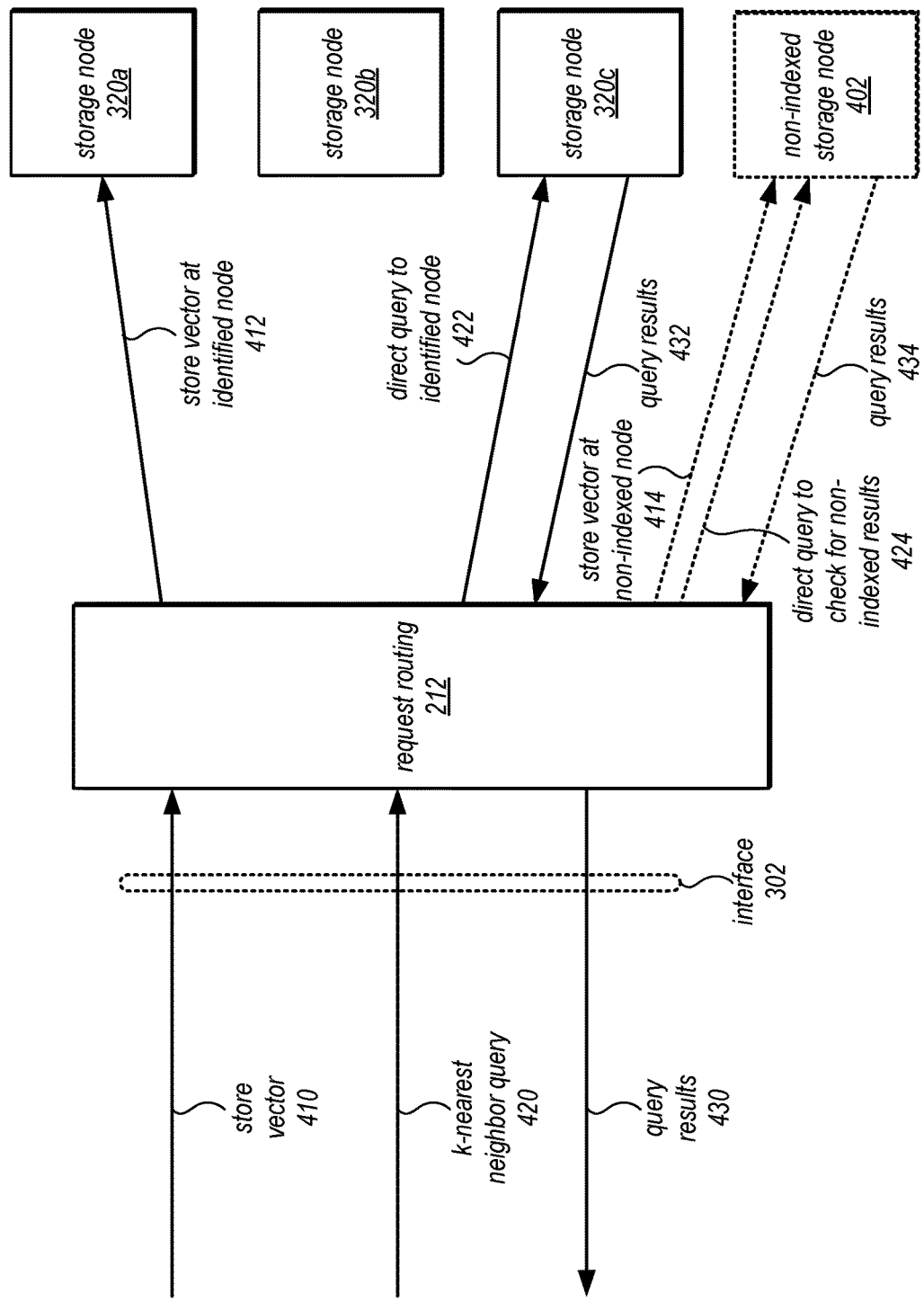
FIG. 4 is a logical block diagram illustrating data set access according to relative differences indicated by a cover tree, according to some embodiments.

FIG. 4 is a logical block diagram illustrating data set access according to relative differences indicated by a cover tree, according to some embodiments. Request routing 212 may be implemented by one or multiple nodes that may dispatch or direct requests to storage nodes according to the partitioning of a data set according to relative difference. For example, a request to store a vector 410 may be received via interface 302. Request routing 212 may traverse the root portion of the cover tree generated for the data set to identify which storage node stores the sub-portion of the cover tree that would include the vector. In one example, request routing 212 may identify storage 320a as storing the sub-portion of the cover tree that would include the vector, and make a request to store 412 the vector at the identified node.

As discussed below with regard to FIG. 7B, in some embodiments, storage nodes may no longer contain the space to store a vector identified for that storage node, or may not be able to store a vector without violating separation, covering, or nesting features of a cover tree (as discussed below). Instead, another node non-indexed storage node 402 may be implemented to store the unindexed vectors (which may not be indexed according to the cover tree but could be indexed according to another indexing scheme with respect to non-indexed storage node 402 alone). Thus, as illustrated in FIG. 4, a request to store the vector 414 at non-indexed node may be alternatively performed, in some embodiments. In at least some embodiments, a repartition threshold may be compared to the number of vectors or data stored in non-indexed storage node 402. If the number of vectors or data exceeds the threshold, then an operation to redistribute the vectors of the data, and the vectors in non-indexed storage node 402 may be included for generating a new cover tree and redistributing the data (e.g., among a larger number of storage nodes), in some embodiments (e.g., repeating the techniques described in FIGS. 6A and 7B).

A k-nearest neighbor query 420 may be received at request routing 212 via interface 302, in some embodiments. As noted below with regard to FIG. 7A, in some embodiments, k-nearest neighbor query may specify a number of results to return (e.g., "k") as well as given vector for which the comparison of other vectors is made in order to perform query 420. Request routing 212 may traverse the root portion of the cover tree generated for the data set to identify which storage node stores the sub-portion of the cover tree that would include the vector. In one example, request routing 212 may identify storage 320c as storing the sub-portion of the cover tree that would include the vector, and send a query to the identified storage node, by the given vector. That storage node 320c may perform the query and return results 432 to request routing or directly to a requesting client (e.g., in some embodiments, not illustrate). Also like store request 410, if a non-indexed storage node 402 is implemented, then a query may also be sent 424 to return results 434. The results may be combined together or presented separately with results 432, in some embodiments. The query results 430 may then be provided back to a client 430.

Figure 5:
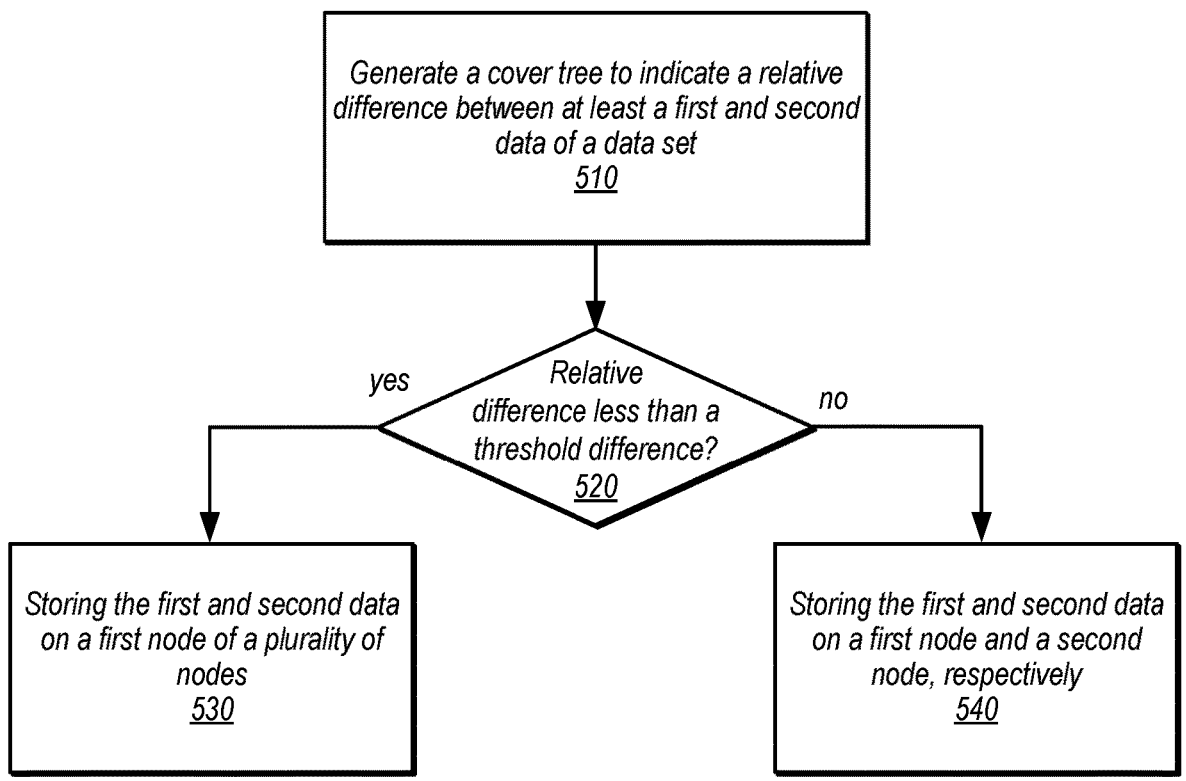
FIG. 5 is a high-level flowchart illustrating various methods and techniques to implement partitioning data according to relative differences indicated by a cover tree, according to some embodiments.

The examples of partitioning data according to relative differences indicated by a cover tree as discussed in FIGS. 2-4 above have been given in regard to a storage service (e.g., a distributed storage that stores vector data sets in a cluster of nodes). However, various other types of data access, management, or control systems or data processing systems may implement partitioning data according to relative differences indicated by a cover tree, in other embodiments. FIG. 5 is a high-level flowchart illustrating various methods and techniques to implement partitioning data according to relative differences indicated by a cover tree, according to some embodiments. These techniques, as well as the techniques discussed with regard to FIGS. 6A-7B, may be implemented using components or systems as described above with regard to FIGS. 2-4, as well as other types of data stores, storage engines, systems, or clients and thus the following discussion is not intended to be limiting as to the other types of systems that may implement the described techniques.

As indicated at 510, a cover tree may be generated to indicate a relative difference between at least a first and second data of a data set, in some embodiments. For example, as discussed below with regard to FIG. 6A, a cover tree may be generated according to different features including covering and separation which may define relative differences between nodes (and the data they represent). Thus the position of data, such as the first and second data, may be determined or indicated by the respective differences of the nodes of a cover tree, in some embodiments. The data set may be various kinds of data. Vectors, for example, may be stored in groups of similar vectors in order to facilitate operations such as k-nearest neighbor queries. In turn k-nearest neighbor queries can support various kinds of machine learning and other comparison-based operations, including, but not limited to localized support vector machines, dimensionality reduction, and reinforcement learning.

In order to co-locate data with other similar data, storage operations to distribute data amongst multiple nodes may include a determination of relative difference between the nodes. For example, as indicated at 520, a relative difference between the first and second data may be evaluated with respect to a difference threshold. A difference threshold may be indicated or determined according to the differences between nodes enforced according to the features maintained for the cover tree. For example, the relative difference between a parent and child nodes in a portion of a cover tree may be determined based on the maximum difference that may be allowed between the child nodes and the parent according to the covering feature of a cover tree. In some embodiments, the threshold difference may be evaluated by determining whether or not both the first data are located within a same portion of the cover tree (e.g., child nodes of a same parent).

As indicated a 530, if the first and second data have a relative difference less than a threshold difference, then the first and second node may be stored together on a first node of a plurality of nodes that store data of the data set, in some embodiments. For example, both the first data and the second data may be included as child nodes of a same parent in the cover tree. The first node may be mapped or assigned to that portion of the cover tree that includes both the first and second data, in some embodiments. If the relative difference between the first and second data is, however, greater than or equal to the threshold difference, then the first and second data may be stored at a first and second node respectively, in some embodiments. For example, the location of the first data may be included in a portion of the cover tree mapped to the first node and the location of the second data in a different portion of the cover tree mapped to the second node, in some embodiments.

When storing the data at the nodes, a different indexing scheme or arrangement (e.g., other than a cover tree) may be implemented, in some embodiments. For example, once a node is identified, a locally-sensitive hashing may be performed, in some embodiments. Thus performing queries or other access operations to particular node may include searching a cover tree to determine a node storing a partition of the data set, and performing another search technique for data with respect to other data stored by the determined node.

Figure 6A:
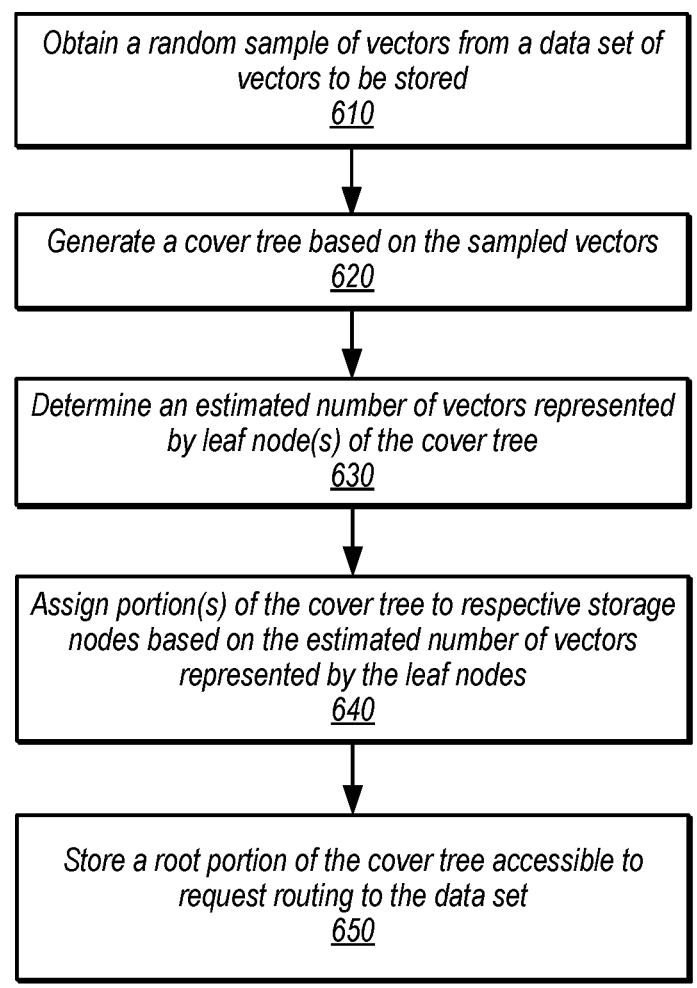
FIG. 6A is a high-level flowchart illustrating various methods and techniques to generate a cover tree to indicate relative differences between vectors in a data set, according to some embodiments.

Different types of cover trees may be generated in order to adjust the partitioning of data. Moreover, different sized data sets may be result in different cover tree generation times or other costs. FIG. 6A is a high-level flowchart illustrating various methods and techniques to generate a cover tree to indicate relative differences between vectors in a data set, according to some embodiments. As indicated at 610, a random sample of vectors may be obtained from a data set of vectors to be stored, in various embodiments. The number of vectors may be determined, in some embodiments, based on the resource limitations or capacities of systems that generate the cover tree (e.g., server processor, memory, network, or persistent storage capacity). For example, from a data set of 1 billion vectors, a sample of 10 million vectors may be obtained (which may be determined based on the number of vectors that can be held in a system memory in order to perform cover tree generation techniques without spilling to disk and/or dividing the work with other systems). Random number generation and other randomization techniques may be performed to select the vectors (which may or may not be stored in an organized fashion relating to their relative differences) in some embodiments. In some embodiments, the sample size may be determined based on the content of the data. For example, the greater the number of features in the data (e.g., vector dimensions), the smaller the size of the sample to be taken for cover tree generation, in one embodiment.

As indicated at 620, a cover tree may be generated based on the sampled vectors, in some embodiments. Different cover tree generation techniques may be implemented based on properties specified for a level within the cover tree, nesting (e.g., where each child is included within a space occupied by a parent), covering (e.g., where for each child node there exists a parent node where the distance between the parent and the child is less than $2^i$ where i is the number of the parent level (counted from the child level)), and separation (e.g., where for each node in a level the distance between nodes is greater than $2^i$). In at least some embodiments, the generation technique may be a simplified cover tree where each node p in the tree contains a single data point and (a) where the nesting feature is maintained so that every node p has an associated integer level(p) and for each child q of p, level (q)–level (p)–1; (b) where the covering feature is maintained so that for every node p, the covering_distance (p)=$2^{level(p)}$ and for each child q of p, the distance(p, q) ≤ the covering_distance (p); (c) wherein the separation feature is maintained so that for every node p, the separation_distance (p)=$2^{level(p)-1}$ and for all distinct children q1 and q2 of p, the distance(q1,q2)>separation distance(p).

An example of inserting items into the cover tree while maintain such features can be performed in some embodiments, using two different techniques for two different cases, in some embodiments (which may also be performed when storing vectors as discussed below with regard to FIG. 7B). If a vector cannot be inserted without violating the covering feature, then the level of the tree may be erased by taking any leaf node to serve as a new root, because doing so would not violate the covering constraint. A second case may cover other insertions (where the vector insertion would not violate the covering feature), and thus may recursively descend through existing levels of the tree, search each level to find a node that can be inserted into without violating the covering constraint. When a node is found, then the function descends another level from that node. If no node is found, then the vector can be inserted into that level of the cover tree as a new leaf node.

As indicated at 630, an estimated number of vectors represented by leaf nodes in the cover tree may be determined, in some embodiments. For example, the sample size may be a fraction of the total size of the data set, so that for every vector stored at a leaf node within a section of the cover tree that leaf node may represent a number of nodes found by dividing the total size of the data set (e.g., 1,000,000,000/10,000,000=100).

Figure 6B:
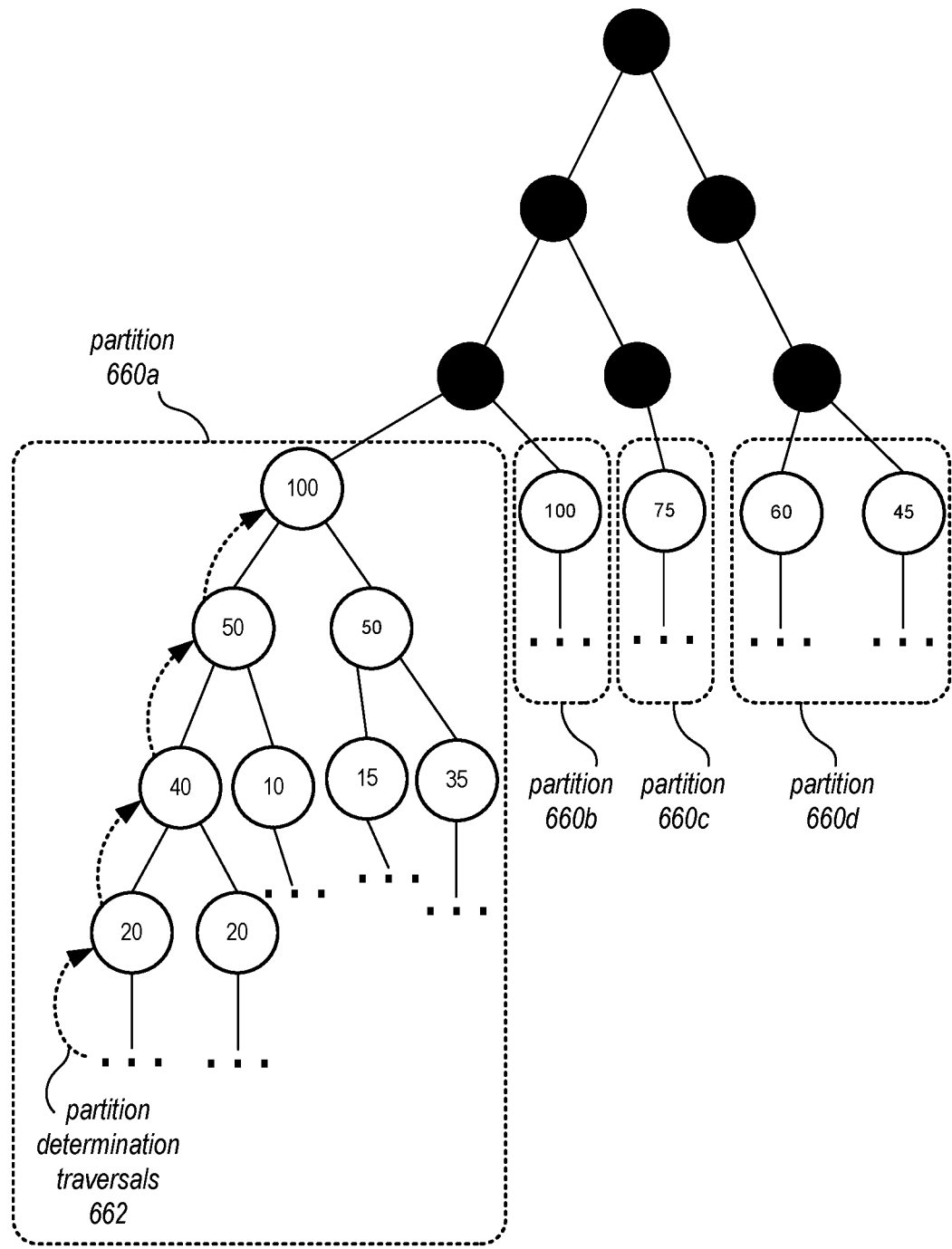
FIG. 6B illustrates partition assignments to a cover tree, according to some embodiments.

As indicated at 640, portions of the cover tree may be assigned to respective storage nodes, based on the estimated number of vectors represented by the leaf nodes, in some embodiments. For example, a number (or range of numbers) of vectors may be stored on a storage node and the subportions of the tree that include an estimated number of vectors in that range may be assigned to a partition. Partitions may not break across inheritance lines, in some embodiments (e.g., so that sub portions may have to have the same parent). FIG. 6B illustrates partition assignments to a cover tree, according to some embodiments. In at least some embodiments, a traversal-based technique may be implemented to determine when a partition of a cover tree should be performed. Traversal of a cover tree may begin from a leaf node and continue up the tree until a node is found that is a parent for an estimated number of vectors within the partition range is identified, in some embodiments. A range of 70 to 120, for example may be used. Partition 660a may be assigned to include two sub-portions, each with 50 estimated vectors), as may be determined according to partition traversals 662 which may continue up until 100 vectors is found. Partition 660b may be assigned to a different storage node (with an estimated 100 vectors). Partition 660c may be assigned to a third storage node (with an estimated 75 vectors) and partition 660d may be assigned to a fourth storage node (with an estimated 105 vectors). The assignments may be maintained in a mapping or may be identified as network address, location identifiers, or other locations within the parent node in the cover tree.

As indicated at 650, the root portion of the cover tree (which may be the combined portion not assigned to a partition) may be stored so that it is accessible to request routing (e.g., on a request routing node or cluster of nodes), in some embodiments. The root portion may be used to identify storage nodes for performing access requests, as discussed below.

As discussed above with regard to FIG. 1, partitioning data according to relative differences indicated by a cover tree may provide partitions that co-locate data that is relatively similar. In order to find similar data with respect to given data, a node can be identified which likely stores some (or all) of similar data. Queries to retrieve similar data may thus be processed more efficiently if the number of locations to search is reduced (e.g., to a single node), in some embodiments. FIG. 7A is a high-level flowchart illustrating various methods and techniques to perform a request to perform a k-nearest neighbors query at data store partitioned according to relative differences indicated by a cover tree, according to some embodiments.

As indicated a 710, a k-nearest neighbor query may be received with respect to a vector that is directed to a data set of vectors stored at respective nodes, in some embodiments. For example, the request may be formatted according to an interface (e.g., similar to interface 302 discussed above) which may provide a format for specifying a vector (e.g., data structure, type, size, location within a request, etc.) that serves as the predicate, test point, or query point for determining similarity, a data set identifier (e.g., to include compare vector with the correct data set as a data store may contain multiple data sets), a number of items to return (e.g., "k=10"), a location to send results, or other information for performing the query (e.g., result format) in some embodiments.

As indicated at 720, a root portion of a cover tree generated to indicate relative differences between the vectors may be evaluated to identify node(s) to perform the query, in some embodiments. For example, the root portion may be evaluated according to traversal or search techniques to identify where a leaf node for the vector would be inserted. A similarity measure or technique may, for instance, compare the vector with a vector or other metric space boundary represented by a node (e.g., using triangle inequality, cosine similarity or other metric space similarities for vectors) to determine which branch of the cover tree to search next. The traversal may continue until a location where a leaf node for the vector would be inserted, in some embodiments. Once the leaf node is identified, an assignment or mapping of the location for the leaf node may be compared with leaf node mappings to determine which node may be assigned the portion of the cover tree that includes the leaf node, in some embodiments. Various cover tree traversal techniques, such as techniques generated or performed based on a "space tree" framework (which may decompose metric space for the data into sub-spaces in to parallel-to-axis fashion, assigning classifiers to each sub-space, and using the appropriate classifier on the sub-space being searched), and thus the previous example is not intended to be limiting.

While some query traversal techniques may return a single result, in some embodiments, multiple nodes may be searched. Consider the non-indexed node, discussed above with regard to FIG. 4, and below with regard to FIG. 7B. A non-indexed node may also store relevant (e.g., similar results) with respect to a given vector in a query, and thus the non-indexed nodes may be searched in addition to a node identified by a cover tree traversal.

As indicated at 740, result(s) of the k-nearest neighbor query performed at the identified node(s) may be returned, in some embodiments. For example, the identified node may perform nearest neighbor search techniques (with may utilize the cover tree portion or other nearest neighbor search index structures, locally sensitive hashing, etc.) to determine results (as discussed above with regard to FIG. 2. If multiple nodes perform the query (e.g., an indexed node and a non-indexed node), then the results generated for the query may be combined at a request routing component or sent directly to a client either of which may perform combinations or eliminations (e.g., other comparisons to eliminate results that are not within the k threshold, as extra results may be returned when searching multiple nodes) to generate a final result. The results may be formatted according to a format specified in the query and/or directed to a location identified in the query, in some embodiments (which may be different than the requesting client).

A data set may grow and change over time. Different vectors may be added to describe further information useful to a k-nearest neighbor search and analysis, in some embodiments. For example, more users may be added to a system, with different profiles (e.g., described by a vector) used to make item recommendations according to k-nearest neighbor results. In order to enrich the data set, different vectors may be added. FIG. 7B is a high-level flowchart illustrating various methods and techniques to perform a request to store a vector in a data store partitioned according to relative differences indicated by a cover tree, according to some embodiments.

As indicated at 750, a request to store a vector in a data set of vectors stored at respective nodes may be received, in some embodiments. For example, the request may be formatted according to an interface (e.g., similar to interface 302 discussed above) which may provide a format for specifying a vector (e.g., data structure, type, size, location within a request, etc.) and a data set identifier (e.g., to include the vector in the correct data set as a data store may contain multiple data sets), in some embodiments.

As indicated at 760, a root portion of a cover tree generated to indicate relative differences between the vectors may be evaluated to determine whether the nodes of the store can store the vector, in some embodiments. Similar to the node identification techniques discussed above, the root portion of the cover tree may be "walked" to identify a pointer to a leaf node (or group of leaf nodes) assigned to a storage node, in some embodiments. Assignment or mapping information that identifies which leaf nodes map to which storage nodes may be accessed in order to determine a network address, identifier, or location identifier for the node. If however, no leaf or portion of the cover tree can be found to hold the new vector (e.g., in order to maintain the cover tree features of covering, nesting, or separation, then the nodes may be unable to store the new vector. Similarly, if an identified node is full, then the nodes may be unable to store the vector. In one example, storage nodes may acknowledge to the request router when a vector is successfully added to storage at the node. If, no more storage remains, the acknowledgement may indicate that the storage node can no longer store vectors. A request router may maintain list of full nodes which may be checked before sending a storage request to a node, in some embodiments. In other embodiments, the storage nodes may accept or reject the request to store the vector and may indicate that storage node is too full as the reason for rejecting a storage request.

As indicated by the negative exit from 770, the vector may be stored at the identified node if the nodes are able to store the vector, as indicated at 790. Whereas if the nodes are unable to store the vector, as indicated by the positive exit from 780, the vector may be stored at a non-indexed node that stores vectors for the data set.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
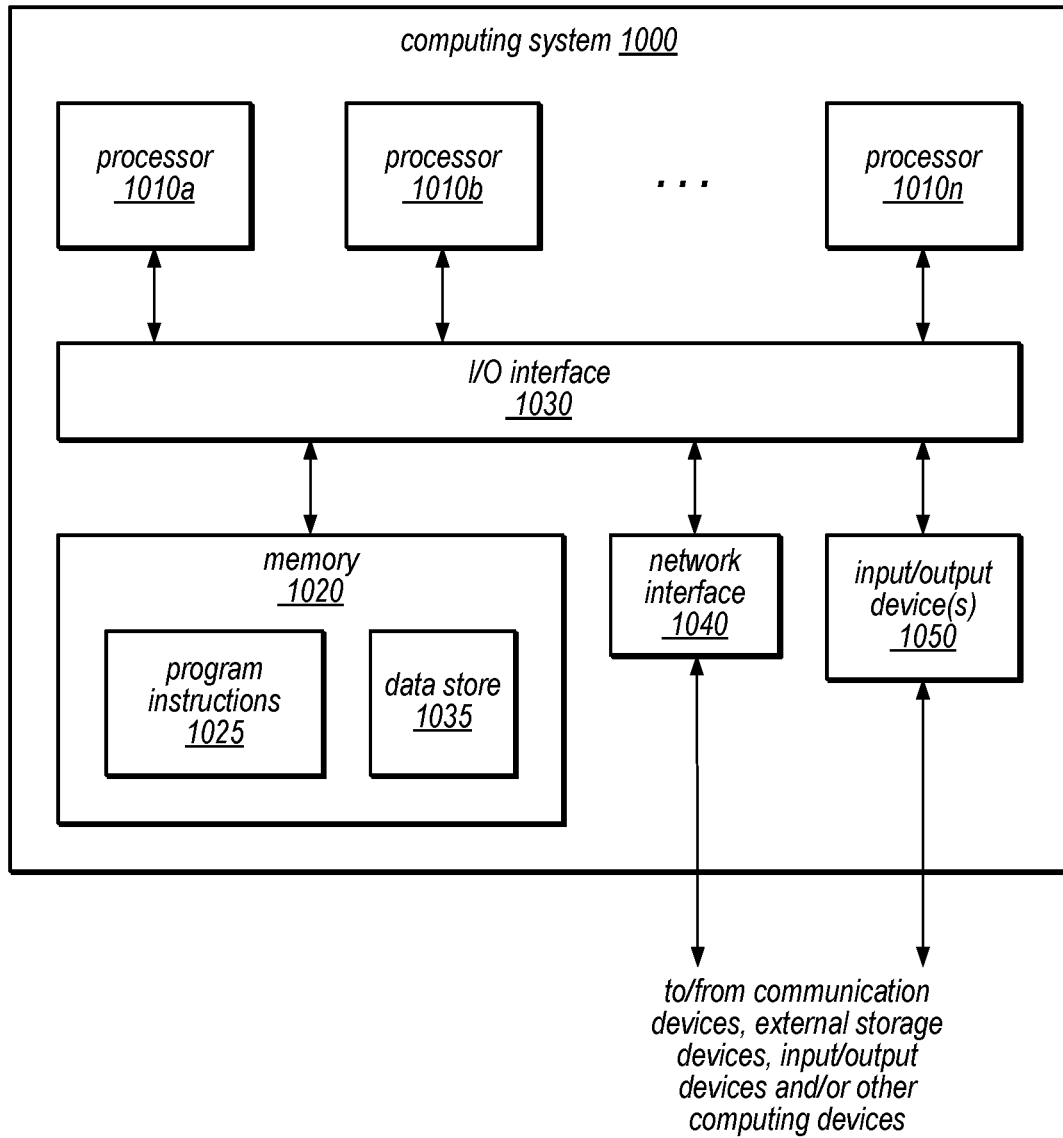
FIG. 8 is a block diagram illustrating an example computing system, according to some embodiments.

Embodiments of partitioning data according to relative differences indicated by a cover tree as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing instructions that when executed by the at least one processor cause the at least one processor to implement a distributed data store, the distributed data store configured to:
        receive a k-nearest neighbor query for a vector, the k-nearest neighbor query directed to a data set distributed in different partitions at a plurality of storage nodes of the distributed data store;
        evaluate, with respect to the vector, a cover tree that indicates assignments of the different partitions to the plurality of storage nodes according to differences between data stored in the data set to identify a storage node of the plurality of storage nodes that stores one of the partitions to perform the k-nearest neighbor query for the vector;
        send the k-nearest neighbor query to the identified storage node to be performed; and
        return a result of the k-nearest neighbor query based, at least in part, on a response to the k-nearest neighbor query received from the identified storage node.

2. The system of claim 1, wherein the distributed data store is further configured to:
    send the k-nearest neighbor query to a non-indexed storage node to be performed that stores other data of the data set not included in the cover tree; and
    wherein the returned result to the k-nearest neighbor is further based on a response to the k-nearest neighbor query received from the non-indexed storage node.

3. The system of claim 1, wherein the distributed data store is further configured to:
    evaluate, with respect to the vector, the cover tree to identify another storage node of the plurality of storage nodes that stores another one of the partitions to perform the k-nearest neighbor query for the vector;
    send the k-nearest neighbor query to the other storage node to be performed; and
    wherein the result to the k-nearest neighbor is further based on a response to the k-nearest neighbor query received from the other storage node.

4. The system of claim 1, wherein the k-nearest neighbor query specifies a number of items to return in the result, and wherein the result includes the specified number of items.

5. The system of claim 1, wherein to evaluate the cover tree to identify another storage node of the plurality of storage node the distributed data store is configured to traverse a root portion of the cover tree to identify a location that would include the vector of the k-nearest neighbor query.

6. The system of claim 1, wherein the distributed data store is further configured to eliminate one item received in the response from the storage node that is not within a k threshold for the k-nearest neighbor query before returning the result.

7. The system of claim 1, wherein the distributed data store is a storage service implemented as part of a provider network, wherein the k-nearest neighbor query is received from a client of the storage service according to an Application Programming Interface (API) supported by the storage service to perform the k-nearest neighbor query.

8. A method, comprising:
    receiving a k-nearest neighbor query for a vector, the k-nearest neighbor query directed to a data set distributed in different partitions at a plurality of storage nodes of a distributed data store;
    evaluating, with respect to the vector, a cover tree that indicates assignments of the different partitions to the plurality of storage nodes according to differences between data stored in the data set to identify a storage node of the plurality of storage nodes that stores one of the partitions to perform the k-nearest neighbor query for the vector;
    sending the k-nearest neighbor query to the identified storage node to be performed; and
    returning a result of the k-nearest neighbor query based, at least in part, on a response to the k-nearest neighbor query received from the identified storage node.

9. The method of claim 8, further comprising:
    sending the k-nearest neighbor query to a non-indexed storage node to be performed that stores other data of the data set not included in the cover tree; and wherein the returned result to the k-nearest neighbor is further based on a response to the k-nearest neighbor query received from the non-indexed storage node.

10. The method of claim 8, further comprising:
evaluating, with respect to the vector, the cover tree to identify another storage node of the plurality of storage nodes that stores another one of the partitions to perform the k-nearest neighbor query for the vector;
sending the k-nearest neighbor query to the other storage node to be performed; and
wherein the result to the k-nearest neighbor is further based on a response to the k-nearest neighbor query received from the other storage node.

11. The method of claim 8, wherein the k-nearest neighbor query specifies a number of items to return in the result, and wherein the result includes the specified number of items.

12. The method of claim 8, wherein evaluating the cover tree to identify another storage node of the plurality of storage node comprises traversing a root portion of the cover tree to identify a location that would include the vector of the k-nearest neighbor query.

13. The method of claim 8, further comprising eliminating one item received in the response from the storage node that is not within a k threshold for the k-nearest neighbor query before returning the result.

14. The method of claim 8, wherein the distributed data store is a storage service implemented as part of a provider network, wherein the k-nearest neighbor query is received from a client of the storage service according to an Application Programming Interface (API) supported by the storage service to perform the k-nearest neighbor query.

15. One or more non-transitory, computer-readable storage media, storing program instructions that when executed on or across one or more computing devices cause the one or more computing devices to implement:
receiving a k-nearest neighbor query for a vector, the k-nearest neighbor query directed to a data set distributed in different partitions at a plurality of storage nodes of a distributed data store;
evaluating, with respect to the vector, a cover tree that indicates assignments of the different partitions to the plurality of storage nodes according to differences between data stored in the data set to identify a storage node of the plurality of storage nodes that stores one of the partitions to perform the k-nearest neighbor query for the vector;
sending the k-nearest neighbor query to the identified storage node to be performed; and
returning a result of the k-nearest neighbor query based, at least in part, on a response to the k-nearest neighbor query received from the identified storage node.

16. The one or more non-transitory, computer-readable storage media of claim 15, storing further instructions that when executed on or across the one or more computing devices cause the one or more computing devices to further implement:
sending the k-nearest neighbor query to a non-indexed storage node to be performed that stores other data of the data set not included in the cover tree; and
wherein the returned result to the k-nearest neighbor is further based on a response to the k-nearest neighbor query received from the non-indexed storage node.

17. The one or more non-transitory, computer-readable storage media of claim 15, wherein the k-nearest neighbor query specifies a number of items to return in the result, and wherein the result includes the specified number of items.

18. The one or more non-transitory, computer-readable storage media of claim 15, wherein, in evaluating the cover tree to identify another storage node of the plurality of storage node, the program instructions cause the one or more computing devices to implement traversing a root portion of the cover tree to identify a location that would include the vector of the k-nearest neighbor query.

19. The one or more non-transitory, computer-readable storage media of claim 15, storing further instructions that when executed on or across the one or more computing devices cause the one or more computing devices to further implement eliminating one item received in the response from the storage node that is not within a k threshold for the k-nearest neighbor query before returning the result.

20. The one or more non-transitory, computer-readable storage media of claim 15, wherein the distributed data store is a storage service implemented as part of a provider network, wherein the k-nearest neighbor query is received from a client of the storage service according to an Application Programming Interface (API) supported by the storage service to perform the k-nearest neighbor query.

* * * * *